ON COURSE (C)
REFERENCE COIL 38

LEFT OF COURSE (A)
REFERENCE COIL 38

RIGHT OF COURSE (B)
REFERENCE COIL 38

Nov. 21, 1961 R. DE LIBAN 3,009,525
GUIDANCE SYSTEMS
Filed Dec. 8, 1955 9 Sheets-Sheet 4
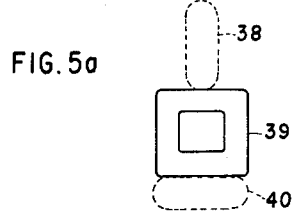
FIG. 5a
TIME → 52
FIG. 7b
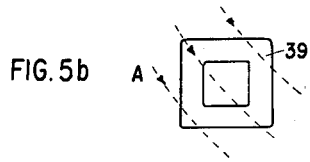
FIG. 5b
TIME → 52
FIG. 7b
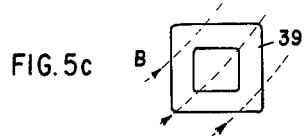
FIG. 5c
TIME → 52
FIG. 7b
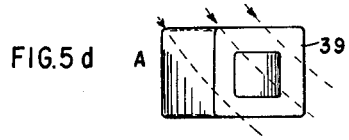
FIG. 5d
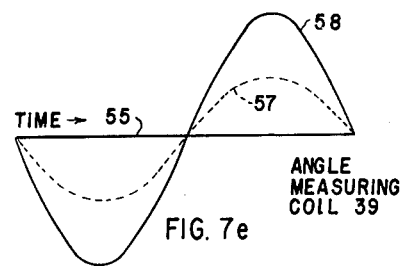
FIG. 7e
ANGLE
MEASURING
COIL 39
INVENTOR.
Robert DeLiban
BY *Brown, Jackson*
*Boettcher & Dienner*
ATTYS.

Nov. 21, 1961 R. DE LIBAN 3,009,525
GUIDANCE SYSTEMS
Filed Dec. 8, 1955 9 Sheets-Sheet 5
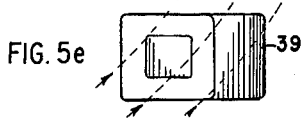
FIG. 5e
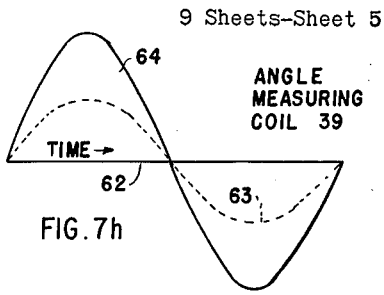
FIG. 7h
ANGLE MEASURING COIL 39
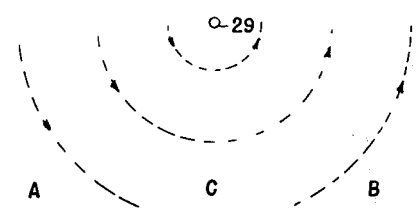
FIG. 6a
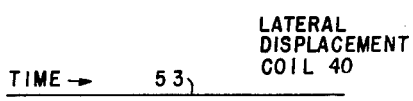
FIG. 7c
LATERAL DISPLACEMENT COIL 40
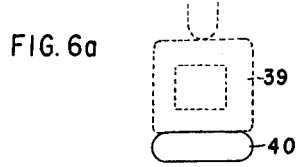
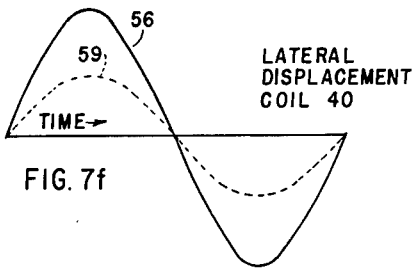
FIG. 7f
LATERAL DISPLACEMENT COIL 40
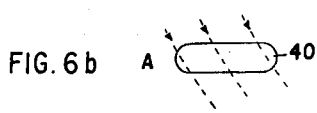
FIG. 6b
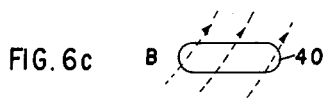
FIG. 6c
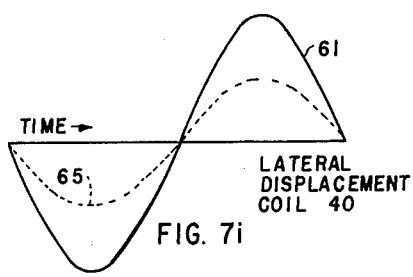
FIG. 7i
LATERAL DISPLACEMENT COIL 40
INVENTOR.
Robert DeLiban
BY
ATTYS.

Nov. 21, 1961  R. DE LIBAN  3,009,525
GUIDANCE SYSTEMS
Filed Dec. 8, 1955  9 Sheets-Sheet 6

INVENTOR.
Robert DeLiban
BY
ATTYS.

Nov. 21, 1961 R. DE LIBAN 3,009,525
GUIDANCE SYSTEMS
Filed Dec. 8, 1955 9 Sheets-Sheet 7

INVENTOR.
Robert DeLiban
BY
ATTYS.

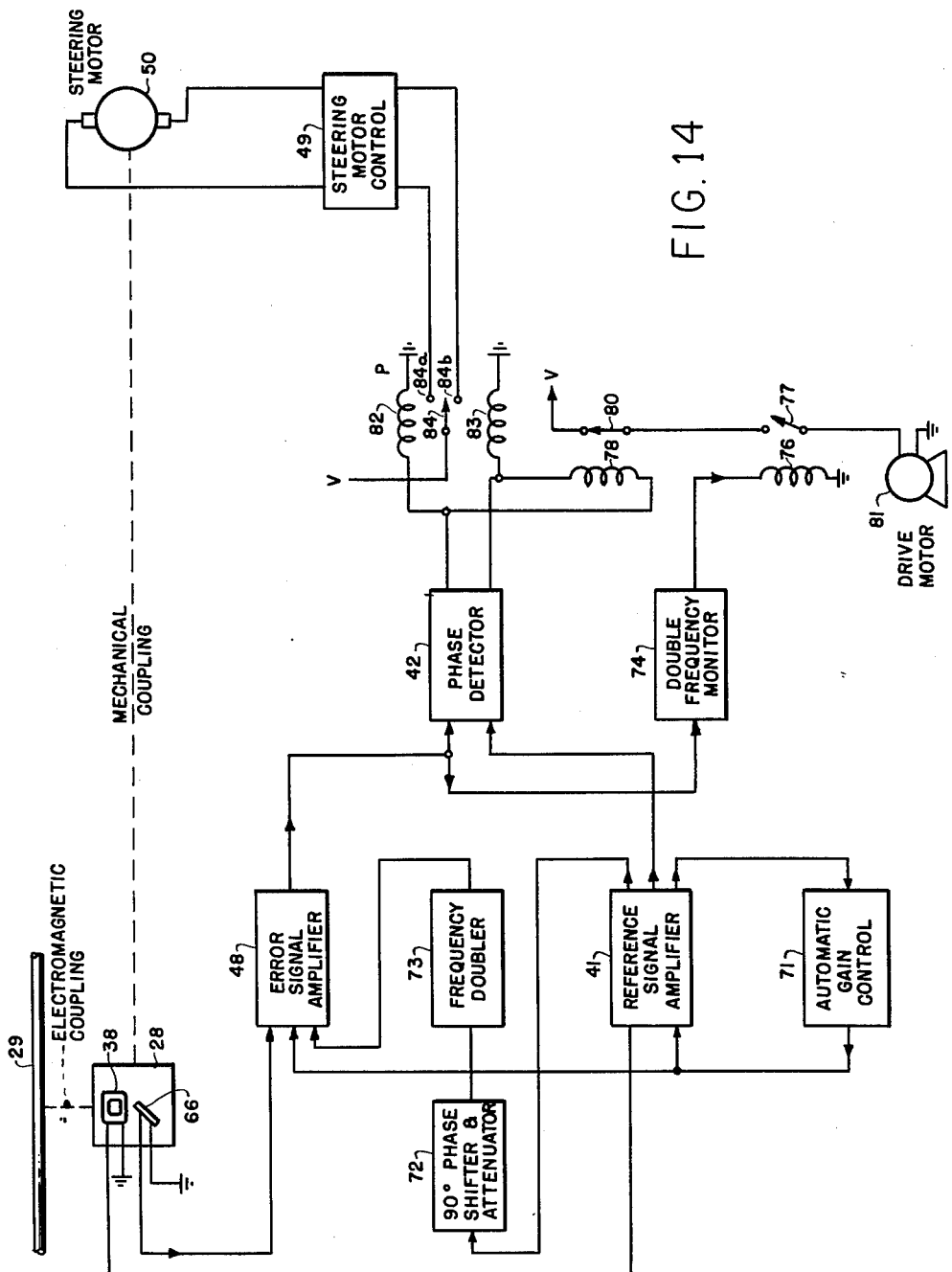

United States Patent Office 3,009,525
Patented Nov. 21, 1961

3,009,525
GUIDANCE SYSTEMS
Robert De Liban, 822 Glenwood Road, Glenview, Ill.
Filed Dec. 8, 1955, Ser. No. 551,770
24 Claims. (Cl. 180—82)

This invention relates to guidance systems, and more particularly to electronic guidance systems for controlling the movement of mobile objects along predetermined courses.

Electronic guidance systems are suitable for many applications. "Guidance system" as used herein includes a means for defining a predetermined course, a mobile object, and means associated with the mobile object for directing its travel relative to the predetermined course. To realize one type of guidance system, existing power and telephone lines can be employed to define a predetermined course for aircraft which are equipped with means sensitive to signals radiated from such lines. Similarly, cables can be laid under water in congested shipping lanes to provide safe guidance for vessels regardless of the weather conditions at the surface. Yet another use for the invention can be had by laying conductors alongside or underneath a highway, thereby providing a guidance system for snow plows when a heavy snow fall obliterates all indication of the roadway and adjoining ground. Automobiles themselves can be similarly controlled for long distances between cities, removing the hazard of collisions due to driver fatigue. The invention also finds applications in the field of entertainment. A miniature guidance system can be constructed by laying an insulated electrical conductor under an ordinary rug, and connecting this wire to a source of electrical energy. A miniature automobile equipped with suitable sensitive means can then be directed over the rug by signals from the conductor laid underneath. Likewise, the larger toy autos often used in amusement parks can be similarly directed. It is apparent that the foregoing examples are but a few of the possible applications of the invention; accordingly, these examples and subsequent illustrations are given as illustrative only, and in no sense by way of limitation.

The novelty and utility of the invention can be most readily shown with respect to a guidance system installed in a factory. Today overhead conveyor systems are frequently used in factories which employ production line assembly of various products. A mechanical conveyor system must follow a fixed route; such a system requires a substantial outlay for equipment, including the motive power, for a considerable power output is required to drive a conveyor belt which either extends for some distance or is required to move heavy loads. A variation of an overhead conveyor system includes the installation of a driving chain system under the floor of a factory, leaving only a small open channel above the driving chain. Trucks may then be fastened to such a driving chain, and thereby driven through the factory following the course of the chain. The mechanical driving chain, like the conveyor, must of necessity follow a fixed course. There is substantial danger of equipment failure by reason of dirt and waste material clogging the chain passage after falling through the open channel. Likewise there is substantial construction work involved in laying a driving chain system, entailing a considerable capital outlay. A minimum of flexibility is present in both mechanical systems, for the route followed is rigidly prescribed beforehand; usually the only variation in course possible is accomplished by detaching a truck from the driving chain or a basket from the conveyor and making the required deviation manually. Such known mechanical guidance systems have high installation costs, substantial maintenance costs, and admit of little flexibility.

It is an object of the invention to provide a guidance system overcoming one or more of the disadvantages of prior art systems.

It is particularly an object of the invention to provide an electronic guidance system which can be easily and economically installed, which requires a minimum of maintenance, which incorporates a high degree of flexibility, and which requires no mechanical connection between the guided object and the guiding, or course-defining, means.

It is a primary object of the invention to provide a guidance system incorporating a novel azimuth control system, causing a mobile object to arrive at a predetermined course by following an optimum approach path. This novel azimuth control system clearly manifests petentable novelty and utility over such prior art systems as taught in Patent Nos. 2,399,291 and 2,317,400, both of which are assigned to the present assignee.

In accordance with the invention an electronic guidance system includes signal means defining a predetermined course, and a mobile object adapted to respond to steering instructions. The system also includes means sensitive to the signal means for deriving steering instructions from the signals, which steering instructions are proportional both to a lateral displacement of the mobile object and to the heading of the mobile object, and means for coupling said steering instructions to the mobile object, thus effecting guidance of the object along a course relative to the predetermined course.

Electronic guidance systems other than the embodiment disclosed and claimed in this teaching will be suggested to those skilled in the art upon examining this disclosure. For example, in place of an electrical conductor, an optically distinguishable strip, or a path made radioactive by artificial means, can define the predetermined course of the system. In the strip embodiment, photocells can comprise the sensitive means of the invention; in the radioactive path system, radiation detectors would comprise the sensitive means. These and many other systems, as will be seen, fall within the scope of this invention.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIGURES 4a, 4b, 4c, 5a, 5b, 5c, 5d, 5e, 6a, 6b and 6c are front views of the elements shown in FIGURE 2, useful in understanding the operation of the invention;

FIGURES 7a, 7b, 7c, 7d, 7e, 7f, 7g, 7h and 7i are graphical illustrations useful in understanding the operation of the invention under various conditions;

FIGURE 9b is a side view of the elements shown in FIGURE 9a;

FIGURES 14 and 15 are block diagrams, partly in schematic form, of protective elements of the invention;

Figure 1:
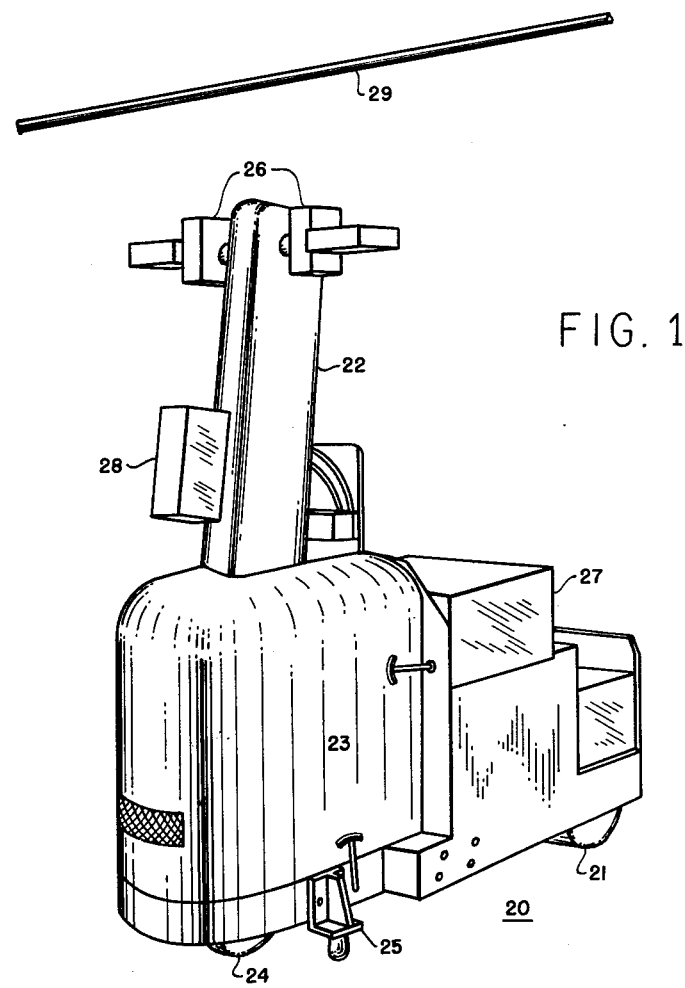
FIGURE 1 is a perspective view of one embodiment of the invention.

Although various forms of an electronic guidance system can be constructed, one type of system employs an electrical conductor to define the predetermined course. A source of electrical energy is coupled to the conductor, and electro-magnetic fields are present adjacent such conductor to provide signals which are representative of the location of the predetermined course or path. A mobile object is provided with means sensitive to such fields to derive steering instructions from the fields, or radiated intelligence, and is thereby directed along a path coincident with or parallel to the predetermined course. More specfically, FIGURE 1 shows an electronic guidance system as utilized to control a tractor truck 20. Such tractor trucks are commercially available and may be purchased, for example, from the present assignee. It will be apparent from this teaching that the invention can as well be applied to other industrial intra-plant equipment as, for example, lift trucks, fork trucks, etc.

In the particular embodiment illustrated in FIGURE 1 truck 20 includes a pair of rear wheels 21, 21 only one of which is shown. Rear wheels 21, 21 are fixed with respect to the longitudinal axis of truck 20. Truck 20 further comprises a steering column 22 journalled in the hood portion 23. A combination front steering and drive wheel 24 is mounted to move with rotation of steering column 22. A pair of side support legs 25, 25 (only one of which is shown) protect truck 20 from lateral tipping which might occur if only the three wheels of the truck defined the base area outside which a vertical projection of the center of gravity must fall to cause truck 20 to tip. A pair of manual control boxes 26, 26 are mounted atop steering column 22, and are electrically connected to the drive motor (not shown) for determining forward and reverse motion and for governing the speed in manual operation only.

In accordance with the invention, an antenna box 28 is mounted by any convenient means to the forward portion of steering column 22. Antenna box 28, as will be explained more fully hereinafter, contains path detection or sensor elements sensitive to electro-magnetic fields in the vicinity of an electrical conductor 29 when current flows therein. An output signal from antenna box 28, proportional both to the lateral displacement of truck 20 and the angular rotation of steering column 22 (both determined with respect to conductor 29), can be coupled to the steering motor control to direct movement of truck 20. In the illustrated embodiment, conductor 29 is disposed substantially parallel to and vertically spaced from the longitudinal axis of truck 20; conductor 29 may include an insulated cover (not shown). Conductor 29 may be suspended from the ceiling or overhead of a structure by any convenient means (not shown), and conductor 29 is a portion of a closed circuit to which is connected a source of electrical power (not shown). Conductor 29 may also be buried under, or located on, the floor of a structure or fastened along a wall or partition of a structure; these various locations of conductor 29 will be better understood after the operation of the invention is explained.

Figure 2:
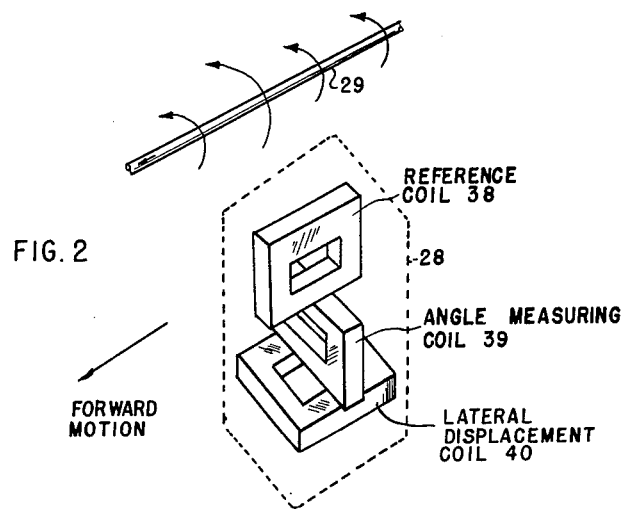
FIGURE 2 is a perspective view of a part of the equipment illustrated in FIGURE 1.

FIGURE 2 shows a first embodiment of the antenna box 28, or path detection means, within which are mounted three coils, or antennae: a reference coil 38, an angle-measuring coil 39, and a lateral displacement coil 40. It will be understood that each coil includes a pair of output leads, which are not shown in FIGURE 2 because they are not necessary to illustrate the physical orientation of the several coils. Arrows are utilized in the drawing to indicate the direction of vehicle travel and the instantaneous direction of current flow in conductor 29.

The orientation of the three coils utilized in FIGURE 2 can be further explained by geometrical comparisons. Considering the coil as a single wire annulus laid flat upon a table, the plane of the annulus is parallel to the plane of the table top. If the coil is made of a number of such windings about a common core the plane of the coil is removed from the table top by a distance equal to half the thickness of the coil. The axis of the coil passes through the center of the annulus, and is perpendicular both to the plane of the coil and the plane of the table top. With respect to the coils of FIGURE 2, the planes of coils 38, 39, and 40 are mutually perpendicular; the axes of the three coils are likewise mutually perpendicular. Comparison of FIGURES 1 and 2 shows that the axis of reference coil 38 is substantially parallel to the transverse axis of the drive and steering wheel 24 of truck 20, the axis of angle-measuring coil 39 is substantially perpendicular to the transverse axis of the drive and steering wheel 24 of truck 20, and in a horizontal plane, and the axis of lateral displacement coil 40 is substantially vertical, being perpendicular to the axis of both coils 38 and 39.

The terms "coil axis" and "coil planes" as used in the present specification and claims hereinafter are consistent with the foregoing definitions.

As it appears from FIGURE 2 and will be more fully explained hereinafter, reference coil 38 is positioned to pick up a maximum signal when directly under conductor 29. The amplitude of this signal necessarily decreases as reference coil 38 is moved laterally to either side of conductor 29, but the phase of the signal remains the same no matter on which side of conductor 29 antenna box 28 is positioned, and independent of the angular rotation of the reference coil up to plus or minus 90° from the on-course heading. As shown hereinafter, the reference coil 38 provides a phase reference signal for the other path determining signals of the system including the signal output of the angle measuring coil 39 and the signal output of the lateral displacement coil 40.

Angle-measuring coil 39 is positioned to pick up no signal when positioned directly under conductor 29 as shown in FIGURE 2. When angle-measuring coil 39 is displaced to either side of conductor 29, the coil still fails to pick up a signal while the vehicle heading shown in FIGURE 2 is maintained. However, if the heading is changed in one direction and angle-measuring coil 39 is thus rotated to cut lines of force and thereby generates a voltage of a first phase which appears at the output leads of angle-measuring coil 39, the amplitude of this voltage increases with each increase of the angle of rotation of coil 39 from the true heading or course. In like manner, if antenna box 28 is rotated in the opposite direction, a voltage of opposite phase is induced in angle-measuring coil 39, which voltage varies in accordance with the amount of rotation and hence with the degree of the deviation from the true course or heading.

Lateral displacement coil 40 picks up no signal in the position shown in FIGURE 2, i.e., with the axis of coil 40 and the conductor 29 in a common plane which is normal to that of the steering wheel axis. As coil 40 is displaced laterally to one side of conductor 29, so that coil 40 and conductor 29 are no longer in a common plane which is normal to the steering wheel axis, a signal is picked up by coil 40, which signal is of a certain phase and of an amplitude which is indicative of the lateral displacement of the coil from the on-course path. If lateral displacement coil 40 is displaced to the opposite side of conductor 29, a voltage of opposite phase is induced in lateral displacement coil 40.

In accordance with the invention, the various voltages simultaneously induced in coils 38, 39, and 40 are functions of the position and alignment of antenna box 28, or path detection means, relative to conductor 29. A consideration of basic electrical laws shows that this is so; a voltage is induced in a coil when there is relative motion between the coil and a suitable field, and when the coil is physically aligned to "cut" the lines of force in the field. It is apparent that the motion may be achieved by physically moving the coil with respect to a stationary field, or by moving the field, as for instance continually reversing the direction of current flow within the conductor. The latter scheme is illustrated here, the coils being fixed. Depending upon the orientation of the coil with respect to the field, for a given amount of alternating current within the conductor either a maximum amount of signal or a zero signal can be induced.

Figure 3:
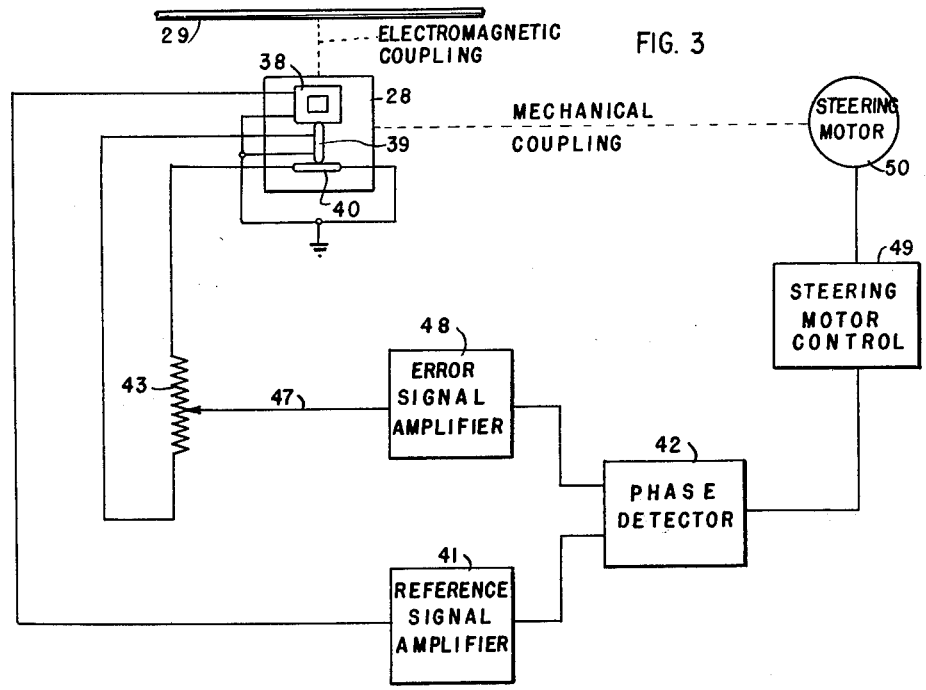
FIGURE 3 is a block diagram, partly in schematic form, of a control circuit of the invention.
Figure 7A:
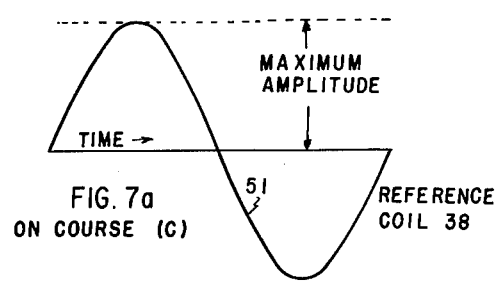

A control circuit for utilizing the voltages induced in the several coils of antenna box 28 in accordance with the invention is shown in FIGURE 3. An output terminal of reference coil 38 is coupled to the input terminal of a reference signal amplifier 41, the output terminal of which is in turn coupled to the lower input terminal of a phase detector 42. An output terminal of angle-measuring coil 39 is coupled to the lower terminal of a signal-mixing potentiometer 43, and an output terminal of lateral displacement coil 40 is coupled to the upper terminal of signal-mixing potentiometer 43. One of the two output leads from coils 38, 39, and 40 is connected to a point of reference potential, for example to ground. Movable arm 47, contacting potentiometer 43, is connected to the input terminal of error signal amplifier 48. The output terminal of error signal amplifier 48 is coupled to the upper input terminal of phase detector 42, the output terminal of which is coupled to the input of steering motor control 49. Steering motor control 49 in its turn is coupled to steering motor 50 which is mechanically connected to drive the steering column 22 of truck 20 (FIGURE 1). Antenna box 28 is mounted on steering column 22, as indicated by the dotted line, to be angularly rotated with steering column 22.

The operation of the embodiment of the invention shown structurally in FIGURES 1–3 is best described in connection with the illustrations of FIGURES 4a–7i. Assume first that truck 20 shown in FIGURE 1, is to travel along a path C directly under conductor 29; with the vehicle on such course, reference coil 38 is directly under conductor 29, and therefore a signal of maximum amplitude is induced in coil 38. This alternating signal is shown as a function of time in curve 51, FIGURE 7a. This signal is coupled through the reference signal amplifier 41 (FIGURE 3) to the lower input terminal of phase detector 42. FIGURE 5a shows that in the on-course path, no signal is induced in angle-measuring coil 39 (curve 52, FIGURE 7b); FIGURE 6a shows likewise that in the on-course path no signal is induced in lateral displacement coil 40 (curve 53, FIGURE 7c). Hence, no signal is coupled to either end of potentiometer 43 (FIGURE 3), and therefore there is no error signal present at the upper input terminal of phase detector 42. The circuitry of phase detector 42 has neither been described nor illustrated because, as will be seen, it may be one of any number of conventional circuits. The input to phase detector 42 at the lower terminal is coupled from reference signal amplifier 41 which, as the name indicates, is utilized only as a reference signal in phase detector 42. No signal is coupled from the output terminal of phase detector 42 unless an error signal appears at the upper input terminal of phase detector 42, which error signal is then compared to the reference signal coupled to the lower input terminal for the purpose of ascertaining in which direction the steering column must be turned. The output of phase detector 42 is proportional to the amplitude of the error signal appearing at the input terminal; the polarity of the output signal depends upon the comparison of the phase of the error signal with the phase of the reference signal. The result of this comparison is then coupled through steering motor control 49 to steering motor 50. In the absence of an error signal, there is no output from phase detector 42, and steering motor 50 is not rotated; truck 20 (FIGURE 1) thus maintains its on-course path.

Figure 4A:
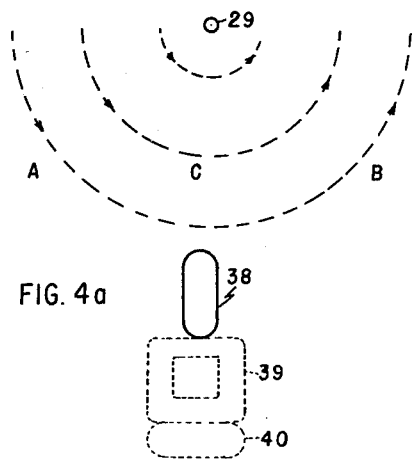
Figure 4B:
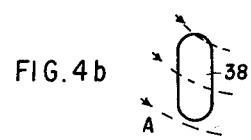
Figure 7D:
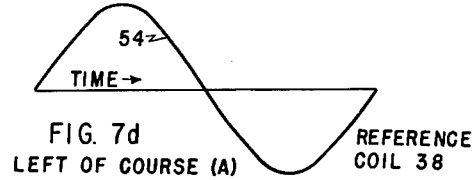
Figure 4C:
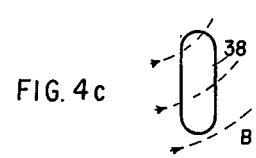
Figure 7G:
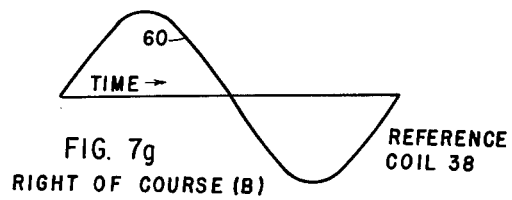

Assume now that truck 20 has been displaced to the left of its on-course path, as viewed from the front (position A as shown in the several figures of the drawing); that the longitudinal axis of truck 20 is parallel to the on-course path, or parallel to conductor 29; and that there has been no corrective action, such as a turning of the steering column 22, toward the direction of the on-course path. FIGURE 4b shows that the signal induced in reference coil 38 remains of the same phase when truck 20 is displaced to the left (position A). Thus a signal of reduced amplitude but of the same phase, represented graphically by curve 54 of FIGURE 7d, is coupled through reference signal amplifier 41 (FIGURE 3) to the lower input terminal of phase detector 42. The reduction in amplitude of the output of reference coil 38 is unimportant, for it has already been shown that the output of coil 38 is employed solely as a phase reference signal.

FIGURE 5b shows the manner in which the angle-measuring coil 39 intercepts the conductor field whenever truck 20 is displaced off course (to position A) but with the steering column heading in the on-course direction. In such event no signal is induced in coil 39, such condition being represented graphically by curve 52 of FIGURE 7b of the drawings. FIGURE 6b shows that, upon displacement to position A, a voltage of a certain phase and amplitude is induced in lateral displacement coil 40. The phase and amplitude of the voltage induced in lateral displacement coil 40 are represented schematically in curve 56 of FIGURE 7f of the drawings. Comparison of signal curve 54 of FIGURE 7d with signal curve 56 of FIGURE 7f shows that the voltage induced in the lateral displacement coil 40 at position A is of the same phase as the voltage induced in reference coil 38 at the same position. The signal output of the lateral displacement coil is supplied to the upper terminal of potentiometer 43 (FIGURE 3), and through error signal amplifier 48 to the upper input terminal of phase detector 42. Phase detector 42 is adjusted so that when the error signal at the upper input terminal is in phase with the reference signal at the lower input terminal, the output of phase detector 42 is a signal which directs steering motor 50 to turn steering column 22 (FIGURE 1) to the right (as viewed from the front), to effect corrective action and return truck 20 to the on-course path. As steering column 22 is rotated, antenna box 28 is likewise rotated, and the relative orientation of the several coils with respect to conductor 29 is therefore altered.

A distinct and important contribution to the art has been made by providing angle-measuring coil 39 to give an indication of the actual heading of truck 20 with respect to the desired on-course path, and the full import of this contribution will be appreciated with the following consideration of the system as truck 20 is controlled to approach the on-course path after having been displaced to the left side.

In accordance with the invention, the position of angle-measuring coil 39 is such that as steering column 22 is rotated from its assumed on-course heading toward the predetermined path to effect corrective action, the angle-measuring coil 39 intercepts the field lines as physically represented in FIGURE 5d of the drawings. A voltage waveform of a phase opposite to that induced in lateral displacement coil 40 is induced in angle-measuring coil 39, as represented by broken-line curve 57 of FIGURE 7e. This increasing voltage which is out of phase with the voltage coupled from lateral displacement coil 40 to the upper terminal of potentiometer 43, is coupled to the lower terminal of the potentiometer. However, until the magnitude of the voltage at the output of coil 39 is equal to that of lateral displacement coil 40, an error signal is coupled through error signal amplifier 48 to the upper input terminal of phase detector 42, and steering column 22 is still driven to the right.

Rotation of steering column 22 continues until the amplitude of the voltage induced in angle-measuring coil 39 increases to a value which is equal in amplitude and opposite in phase to that provided by the lateral displacement coil 40; at this time the amplitudes of the signals coupled from angle-measuring coil 39 and lateral displacement coil 40 to each end of potentiometer 43 (FIGURE 3) are equal, but the phases of the two signals are opposite (curves 58 and 56, FIGURES 7e and 7f). The two signals in phase opposition effect cancellation of each other, and no signal appears at the movable arm 47 which is connected to the input terminal of error signal amplifier 48. There being no signal at the upper input terminal of phase detector 42, there is no output signal to steering motor control 49, and rotation of steering motor 50 ceases. It will be obvious to those skilled in the art that by adjusting the movable arm 47 of potentiometer 43, the relative valve of the signal output of either coil 39 for a given angle of rotation of steering column 22, or of coil 40 for a given lateral displacement from the on-course path, can be varied; in such manner, a steep or very gradual approach course can be realized. Whatever the level of the adjustment, when the signal from angle-measuring coil 39 appearing at arm 47 of potentiometer 43 is equal and opposite to the signal from lateral displacement coil 40 appearing at arm 47, there is no output from phase detector 42, and steering motor 50 ceases to rotate. As truck 20 proceeds on the heading effected by the corrective action, the amount of lateral displacement from the on-course path is reduced, thereby reducing the signal output from lateral displacement coil 40 (curve 59 FIGURE 7f). Thus the amplitude of the signal represented by curve 56 of FIGURE 7f begins to decrease before the amplitude of curve 58 of FIGURE 7e is affected. Because these two signals are coupled to opposite ends of potentiometer 43, and the signal from angle-measuring coil 39 (curve 58) is now greater in amplitude than the signal of lateral displacement coil 40 (curve 59), and is likewise out of phase with the reference signal coupled from reference coil 38, a resultant signal appears at arm 47 which is out of phase with the voltage coupled from the output of reference signal amplifier 41. This out-of-phase signal is coupled through error signal amplifier 48 to the upper input terminal of phase detector 42. Phase detector 42 is arranged so that, when the input signal appearing at the upper terminal is out of phase with that appearing at the lower terminal, phase detector 42 couples a signal through steering motor control 49 to effect rotation of steering motor 50, which rotates steering column 22 to the left (as viewed from the front). Therefore, in accordance with the invention, as truck 20 approaches the desired on-course path directly below conductor 29, steering column 22 is being turned under the direction of steering motor 50 to effect a gradual approach to the on-course path. As a practical matter, it may be desirable to position movable arm 47 so that a smaller signal from angle-measuring coil 39 is required to balance a larger signal from lateral displacement coil 40; such an adjustment provides for a less rapid approach of truck 20 to the on-course path with no overshoot or hunting. The exact adjustment of movable arm 47 of potentiometer 43 to provide an optimum ratio of angle-measuring signal and lateral displacement signal, and hence optimum approach path, depends principally upon forward speed of the truck 20, turning speed of steering column 22, distance of the electrical conductor 29 from truck 20, and magnitude of current in electrical conductor 29.

If truck 20 is now displaced to the right side as viewed facing the vehicle from the front, and as represented by capital letter B in the several figures of the drawings, corrective action is likewise effected to return truck 20 to the desired on-course path. Assume first that truck 20 has been displaced to the right, to position B, and is travelling parallel to conductor 29. The signal output of reference coil 38 in position B is shown in curve 60 of FIGURE 7g. This displacement to the right causes a signal to be coupled from lateral displacement coil 40 as shown by curve 61 of FIGURE 7i; this signal is out of phase with the reference signal coupled from coil 38. Because truck 20 is axially aligned with the on-course path, no signal is coupled from angle-measuring coil 39; this condition is shown by curve 52 of FIGURE 7b. Referring to FIGURE 3, the signal from the lateral displacement coil 40 is coupled through the upper portion of potentiometer 43 to movable arm 47, and through error signal amplifier 48 to the upper input terminal of phase detector 42. The signal from reference coil 38 is coupled through reference signal amplifier 41 to the lower input terminal of phase detector 42. Because the two signals at the input side of phase detector 42 are out of phase, the output of phase detector 42 is such as to effect corrective action by turning truck 20 to the left (viewed from the front). As steering column 22 and antenna box 28 are rotated by this corrective action, a signal is induced in angle-measuring coil 39. The position of angle-measuring coil 39 after partial rotation is illustrated in FIGURE 5e of the drawings, and the signal output after partial rotation is shown by the broken line curve 63 of FIGURE 7h. Because the signal represented by the broken line curve is smaller than the signal coupled from the lateral displacement coil 40, the two signals appearing at the input side of phase detector 42 are still out of phase. Steering motor 50 continues to rotate steering column 22 and antenna box 28 until the signal output from angle-measuring coil 39 (curve 64 of FIGURE 7h) is equal in amplitude to the signal of opposite phase coupled from lateral displacement coil 40 (curve 61 of FIGURE 7i). At that time no signal appears at movable arm 47 and at the upper input terminal of phase detector 42, hence no signal is coupled through steering motor control 49 to steering motor 50, and rotation of steering column 22 is terminated. As truck 20 approaches the desired on-course path, the lateral displacement coil 40 couples a signal of diminished amplitude (curve 65 of FIGURE 7i) to the upper portion of potentiometer 43. As the signal coupled from angle-measuring coil 39 is instantaneously greater in amplitude than the diminished signal from lateral displacement coil 40, the resultant signal appearing at movable arm 47 and at the upper input terminal of phase detector 42 is now in phase with the reference signal. When the input signals are in phase, phase detector 42 produces an output which directs steering motor 50 to effect corrective action by rotating steering column 22 to the right, thus causing truck 20 to make a gradual approach to the desired on-course path. The gradual approach path realized by utilizing the invention is extremely important, as it prevents large error signals from causing undue hunting and from throwing large instantaneous loads upon the motor and other components. Obviously this azimuth control system which provides a gradual approach path (effected by incorporation of angle-measuring coil 39) is a distinct and substantial improvement over any system known in the prior art.

It will be understood from the foregoing description and illustration that conductor 29 need not be strung along the ceiling of a structure; conductor 29 can be buried under the floor of a structure, and provide guidance means for truck 20. If conductor 29 is buried beneath the floor, and the direction of the current in conductor 29 remains the same, the sense of the electromagnetic field affecting coils or antennae 38, 39 and 40 will be opposite to that shown in FIGURES 4a–6c. Therefore the phases of the voltages induced in coils 38, 39 and 40 will be opposite to the wave-forms illustrated in FIGURES 7a–7i, but the cooperation and interaction of the several elements of the invention remain the same as has already been described and illustrated.

Figure 8A:
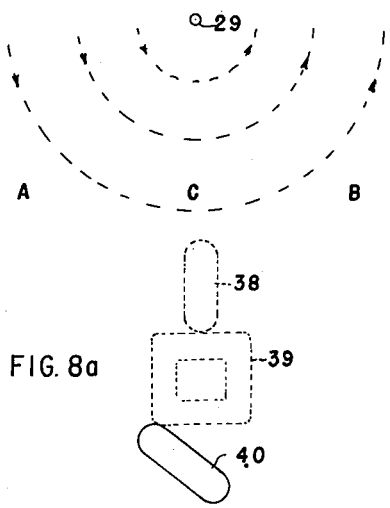
FIGURES 8a and 8b are front views of the elements shown in FIGURE 2 as modified to realize another mode of operation.
Figure 8B:
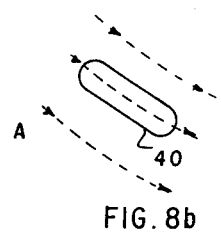

It is also possible by the practice of the invention to cause truck 20 to follow a path parallel to a path directly under conductor 29 (or directly over conductor 29 if the conductor is buried under or laid on the floor). To effect this parallel travel, a slight angular displacement with respect to the horizontal plane is imparted to lateral displacement coil 40 as shown in FIGURE 8a. Assuming that truck 20 is traveling directly beneath conductor 29, as illustrated in FIGURE 1, and that lateral displacement coil 40 has been rotated from the position shown in FIGURE 6a to that shown in FIGURE 8a, as truck 20 is directly under conductor 29, a voltage is induced in lateral displacement coil 40; this voltage is of the same phase as that formerly induced when truck 20 was displaced to the right, to position B (FIGURE 6c). The signal induced in lateral displacement coil 40 is coupled through the upper portion of potentionmeter 43, through error signal amplifier 48 to the upper input terminal of phase detector 42 (FIGURE 3). The signal from lateral displacement coil 40 is out of phase with the reference signal appearing at the lower input terminal of phase detector 42. Therefore, the output of phase detector 42 is a signal which effects corrective action by turning steering motor 50, and thereby steering column 22, to the left (viewed from the front). As steering column 22 and angle-measuring coil 39 are rotated from a position in axial alignment with the on-course path, a voltage is induced in angle-measuring coil 39; the voltage induced in coil 39 is out of phase with that induced in lateral displacement coil 40. When these two out-of-phase signals are equal in amplitude, there is no input signal at the upper terminal of phase detector 42, and steering motor 50 ceases rotation. Truck 20 is thus directed toward point A (FIGURE 8a), and will effect a gradual approach to a path parallel the on-course path. When truck 20 reaches point A, the plane of lateral displacement coil 40 is tangent to the lines of force representing the magnetic field adjacent conductor 29; this condition is illustrated in FIGURE 8b. At point A no voltage is induced in lateral displacement coil 40; in this parallel on-course path, angle-measuring coil 39 is axially aligned with a path directly under conductor 29, and therefore no voltage is induced in angle-measuring coil 39. Thus truck 20 settles upon a stable path parallel to conductor 29, and displaced laterally from conductor 29 by a distance dependent upon the angular rotation of lateral displacement coil 40 from the horizontal plane. It is obvious that the rotation of coil 40 in the opposite direction will cause truck 20 to seek a path to the right, toward the position B shown in the several figures of the drawings. It is also obvious that such a stable parallel path can be achieved by rotation of angle-measuring coil 39 to the positions of FIGURES 5d or 5e. Truck 20 then moves sideways until the actual output signal of lateral displacement coil 40 balances the error signal artificially induced in angle-measuring coil 39.

It is seen that rotation of lateral displacement coil 40 or of angle-measuring coil 39 causes truck 20 to seek and follow a course parallel to and offset from a line directly beneath or over conductor 29. This teaching can be utilized to provide plural path traffic arrangements with a single conductor. As an example, given a certain angular displacement of coil 40, truck 20 seeks and follows a course offset by a certain distance to one side of conductor 29. When turned in the opposite direction truck 20 seeks a course offset by an equal distance but to the opposite side of conductor 29. Thus important economies are effected by utilizing a slight rotation of lateral displacement coil 40 to facilitate two way traffic along a single guidance conductor, It is evident from this teaching that a number of trucks travelling in the same direction can be guided along parallel paths when only a single conductor defines the course; this is readily accomplished by tilting the lateral displacement coils of the several trucks to different angles of inclination with respect to the horizontal plane.

A consideration of the foregoing teaching with respect to parallel travel by adjustment of coils 39 or 40 shows that conductor 29 can be secured along a wall of a structure, as well as to the ceiling or floor, providing conductor 29 is not located in the plane of motion of truck 20. Additional flexibility is thus secured for the system; for example, a wall might separate two traffic aisles, or paths. A single conductor fastened along one wall when energized produces electromagnetic fields on each side of the wall, thereby providing a guide path in each traffic aisle.

Figure 9A:
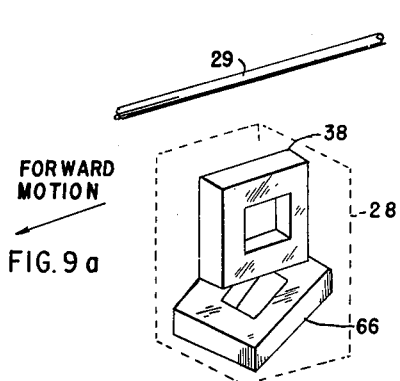
FIGURE 9a is a perspective view illustrating another embodiment of the elements shown in FIGURE 2.
Figure 9B:
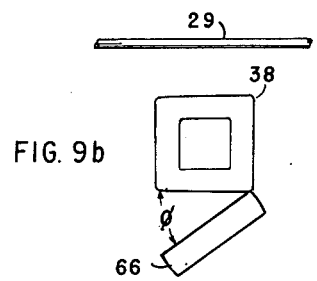

A consideration of the voltages induced in angle-measuring coil 39 and lateral displacement coil 40 as shown in the perspective view of FIGURE 2, leads to the conclusion that coils 39 and 40 can be removed and effectively replaced by a single inclined coil. Such a construction is more economical than that shown in FIGURE 2, yet functions equally as well. Figure 9a shows an antenna box 28 which includes a reference coil 38 and a combination coil 66; the orientation of combination coil 66 with respect to reference coil 38 is likewise illustrated in the side view of FIGURE 9b. FIGURE 9b shows an angular rotation, represented by the angle $\phi$ between two edges of coils 38 and 66, and two other edges at opposite ends of the same surfaces are contiguous. Inspection of FIGURES 9a and 9b shows that an angle-measuring signal can be derived from the total signal present in combination coil 66, and that this angle-measuring signal is proportional both to the total signal present in coil 66 and to the degree of rotation of coil 66 from the vertical plane. Likewise, a signal proportional to the lateral displacement of truck 20 is induced in combination coil 66, which signal is a function both of the total signal present in combination coil 66 and the degree of rotation of coil 66 from the horizontal plane. It is evident therefore that combination coil 66 can replace both angle-measuring coil 39 and lateral displacement coil 40, shown in FIGURE 2, to realize the new and useful configuration illustrated in FIGURES 9a and 9b. It is likewise evident that combination coil 66 can be tilted to realize parallel-course operation, previously accomplished by tilting coils 39 or 40. This method of operation has been explained above in conjunction with FIGURES 8a, 8b, 5d and 5e.

Figure 10:
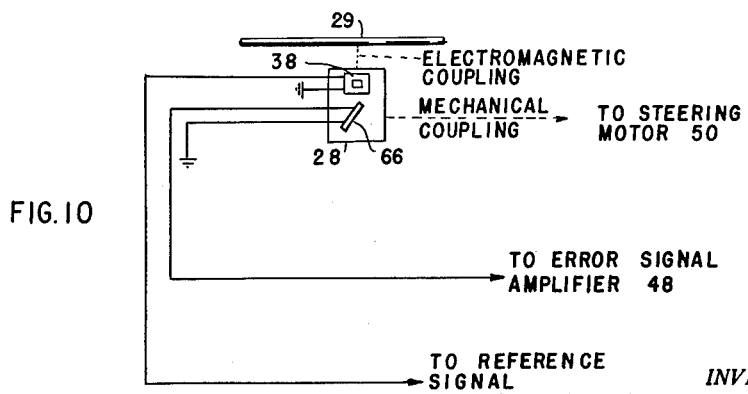
FIGURE 10 is a partial schematic diagram showing the connection of the elements illustrated in FIGURES 9a and 9b.

FIGURE 10 shows the output terminal of the combination coil 66 connected directly to the input terminal of error signal amplifier 48. The relative magnitudes of the angle-displacement and lateral displacement signals is adjusted by varying the angle of inclination $\phi$ (FIGURE 9b), instead of adjusting the arm of a potentiometer. Such connection and operation will be understood from the explanation given in connection with FIGURE 3 of the drawings.

The operation of the embodiment of the invention employing only a reference coil 38 and a combination coil 66 will be further understood from the following explanation. Assume, for instance, that truck 20 utilizes the control circuit illustrated in FIGURE 10, and that truck 20 is displaced to the left of the on-course path, toward point A. If the truck's heading instantaneously remains the same, in alignment with the on-course path, no angle-measuring signal is induced in combination coil 66, but a lateral displacement signal similar to curve 56 of FIGURE 7f is induced in coil 66. This results in an error signal being coupled to phase detector 42, and corrective action is effected by rotating steering column 22 of truck 20; this operation will be understood from the foregoing explanation. Rotation of steering column 22 causes a voltage to be induced in combination coil 66 similar to that represented by curve 58 of FIGURE 7e; when the angle-measuring signal is equal and opposite to the lateral displacement signal, truck 20 approaches the desired on-course heading by following an optimum approach path. It is obvious that by changing the angle of inclination, various adjustments of the approach path can be effected. Let us assume that it is desired that truck 20 approach the on-course path at an angle steeper than the optimum approach path. If angle $\phi$ (FIGURE 9b) is made smaller, the lateral displacement signal is greater than the angle-measuring signal for a given amount of displacement and rotation of steering column 22; therefore, a greater rotation of steering column 22 is required to effect corrective action and approach the on-course path. Likewise, a very gradual approach can be effected by making angle $\phi$ greater, that is, by rotating combination coil 66 nearer the vertical than the horizontal plane. The economic advantages of the two-coil embodiment illustrated in FIGURES 9a and 9b, in conjunction with the simplified control circuit shown in FIGURE 10 are clear and evident. So effective and economical has this form of the invention proved that the commercial embodiment of the invention is produced in accordance with this teaching.

Figure 11:
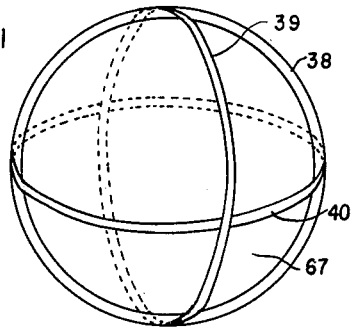
FIGURES 11 and 12 are perspective views illustrating another aspect of the invention.
Figure 12:
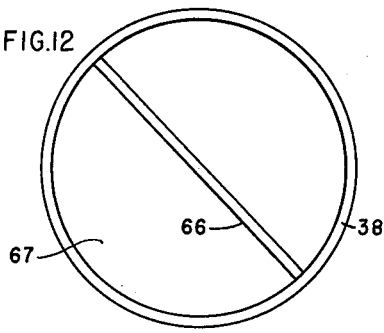

Although coils or antennae 38, 39, 40, and 66 have previously been shown with no centrally positioned cores, it will be understood that suitable cores of ferromagnetic material may be employed in conjunction with the several coils. By ferromagnetic is meant any composition such as iron, nickel, or cobalt which has a permeability much greater than that of air and which is commonly used as a core material in magnetic circuits. FIGURE 11 of the drawings illustrates the use of a solid spherical core member 67 upon which reference coil 38, angle-measuring coil 39, and lateral displacement coil 40 are positioned. FIGURE 12 shows it is likewise possible to employ such a core for positioning reference coil 38 and combination coil 66 of the invention. The use of core materials is well known and understood in the art, and requires no explanation.

Tuning of the coils to the frequency of the alternating current in the electrical conductor is generally advantageous in improving the efficiency and rejecting undesirable interfering signals. This also is well known and understood in the art, and requires no explanation.

Figure 13:
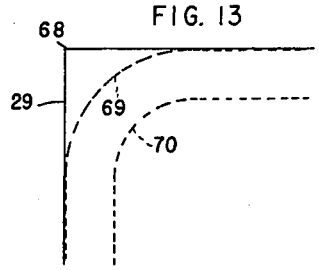
FIGURE 13 is a plan view useful in understanding the operation of the invention.

In the normal installation of a traffic system, the specific nature of the system is designed to complement the needs and requirements of the user. However, certain basic concepts will normally be included in the design of the system. FIGURE 13, for example, shows the manner in which a conductor 29 is installed as a right angle 68 to effect a change in direction. Experience has shown that truck 20 when following the field emanating from conductor 29, follows a course such as that illustrated by curve 69 of FIGURE 13. A consideration of magnetic field theory will demonstrate the reasons behind this behavior. Likewise, if truck 20 is directed along a parallel course such as that illustrated by curve 70, truck 20 makes a gradual turn when the corner is reached. This curvilinear route, inherent in the use of electromagnetic fields as guidance means, permits truck 20 to follow gradual turn paths, which precludes possibility of tipping or developing large error signals in the vicinity of a right angle turn formed by conductor 29. At the same time the conductor can be installed in the simplest possible manner.

FIGURE 14 illustrates one method by which the structure of FIGURE 3 may be constituted, although other control structures will also occur to those skilled in the art. The upper output terminal of phase detector 42 is connected to a coil 82 of polarized relay P, the other terminal of which is connected to a point of reference potential, such as ground. The lower output terminal of phase detector 42 is likewise coupled through a coil 83 of polarized relay P to a point of reference potential, which may be ground. Intermediate coils 82 and 83 is an armature 84, the terminal of which is coupled to a point of reference potential (represented schematically by V). Thus an error signal of one polarity in phase detector 42 causes coil 82 to be energized, displacing the armature 84 of polarized relay P to upper contact 84a and effecting turning of steering motor 50 in one direction; an error signal of the opposite polarity energizes coil 83, and moves relay armature 84 to the opposite position to lower contact 84b, effecting an opposite correction.

In installing the guidance system disclosed herein it may be convenient to utilize different spacings between the electrical conductor 29 and the antenna box 28; similarly, it may be convenient to use different currents in the electrical conductor 29 throughout various portions of the course. To accommodate these variations and still provide maximum accuracy and dependability in following the course, an automatic gain control circuit is desirable. FIGURE 14 illustrates an automatic-gain-control (AGC) circuit 71 connected from the output terminal of reference signal amplifier 41 to input terminals of both reference signal amplifier 41 and error signal amplifier 48 to effectuate a constant output from reference signal amplifier 41 and a corresponding adjustment of amplification in error signal amplifier 48. The use of automatic gain control feedback loops is well known and understood, and needs no explanation here.

FIGURE 14 also illustrates the incorporation of protective relays into the basic control circuit illustrated in FIGURE 3. An output terminal of reference signal amplifier 41 is connected to the input terminal of a 90° phase shifter and attenuator 72, the output terminal of which is connected to the input terminal of a frequency doubler 73. Thus the output signal of frequency doubler 73 is a signal of twice the frequency of the signal coupled from conductor 29 to coils 38 and 66. The output terminal of frequency doubler 73 is connected to the lower input terminal of error signal amplifier 48. There are, therefore, two separate signals of different frequencies at the output terminal of error signal amplifier 48, which may be a wide-band amplifier suitable for passing these two different frequencies. The lower frequency represents the error signal coupled from combination coil 66; depending upon the position of truck 20 relative to conductor 29, this signal of lower frequency may or may not be present. The other signal of higher frequency is the one coupled from frequency doubler 73. Both of these signals are coupled to the upper input terminal of phase detector 42. Phase detector 42, however, is constructed to accept only signals of the lower frequency, coupled from conductor 29 to coils 38 and 66; therefore, only signals at the lower frequency representing the position of truck 20 are coupled through the upper input terminal of phase detector 42 for comparison therein. Signals of both frequencies are coupled to the input terminal of a double frequency monitor 74, which rejects signals of the lower frequency and is sensitive only to signals of the higher frequency. When a suitable signal at the higher frequency is coupled through double frequency monitor 74, a signal is coupled from the output terminal of monitor 74, through relay 76 to ground. This output signal energizes relay 76, which operates to close contacts 77. It is apparent that the operation of relay 76 depends upon the simultaneous presence of three separate indications:

(1) The reference signal must be coupled from conductor 29 through coil 38 to the input terminal of reference signal amplifier 41;

(2) Reference signal amplifier 41 must itself be functioning; and (3) Error signal amplifier 48 must also be functioning.

When all three of these conditions are met simultaneously, the output signal from double frequency monitor 74 couples a suitable signal to relay 76. Drive motor 81 is controlled by the series circuit comprised of contact 77 on relay 76 and contacts 80 on relay 78, the latter contacts being normally closed as shown in FIGURE 14. Therefore, upon energization of relay 76, a circuit is completed from a point of unidirectional operating potential (represented schematically by V) through contacts 80 of relay 78, contacts 77 of relay 76, and through drive motor 81 to another point of reference potential, such as ground. Drive motor 81 is connected mechanically to effect propulsion of truck 20. It is apparent that should the electromagnetic coupling of intelligence from conductor 29 fail, or should either error signal amplifier 48 or reference signal amplifier 41 fail, relay 76 opens, and thereby halts the forward motion of truck 20.

A further protective feature is provided by connecting relay 78 across the output terminals of phase detector 42, whereby any error signal in the output of phase detector 42 causes some current flow through relay 78. Relay 78 may be of the type which permits an adjustment of the amount of current required in the coil to effect operation of the relay. Thus, relay 78 may be adjusted so that arm 80 is not moved from its normal position (as shown in FIGURE 14) until an error signal of a certain magnitude is present at the output terminals of phase detector 42. When a sufficient error signal is present, indicating that truck 20 is deviating from the desired course, relay 78 is energized, thereby breaking the connecting between drive motor 81 and the source of operating potential. Thus truck 20 is stopped if an excessive error signal is present at the output terminals of phase detector 42. Obviously, this adjustment may not be set too critically, for some error signal is normally required to operate polarized relay P and effect corrective action after deviation from the desired path; this will be understood by reference to the foregoing explanation of the several elements of the invention in connection with the other figures of the drawing. However, excessive error signal, indicating some malfunctioning of the system, energizes relay 78 and stops the truck 20.

Figure 15:
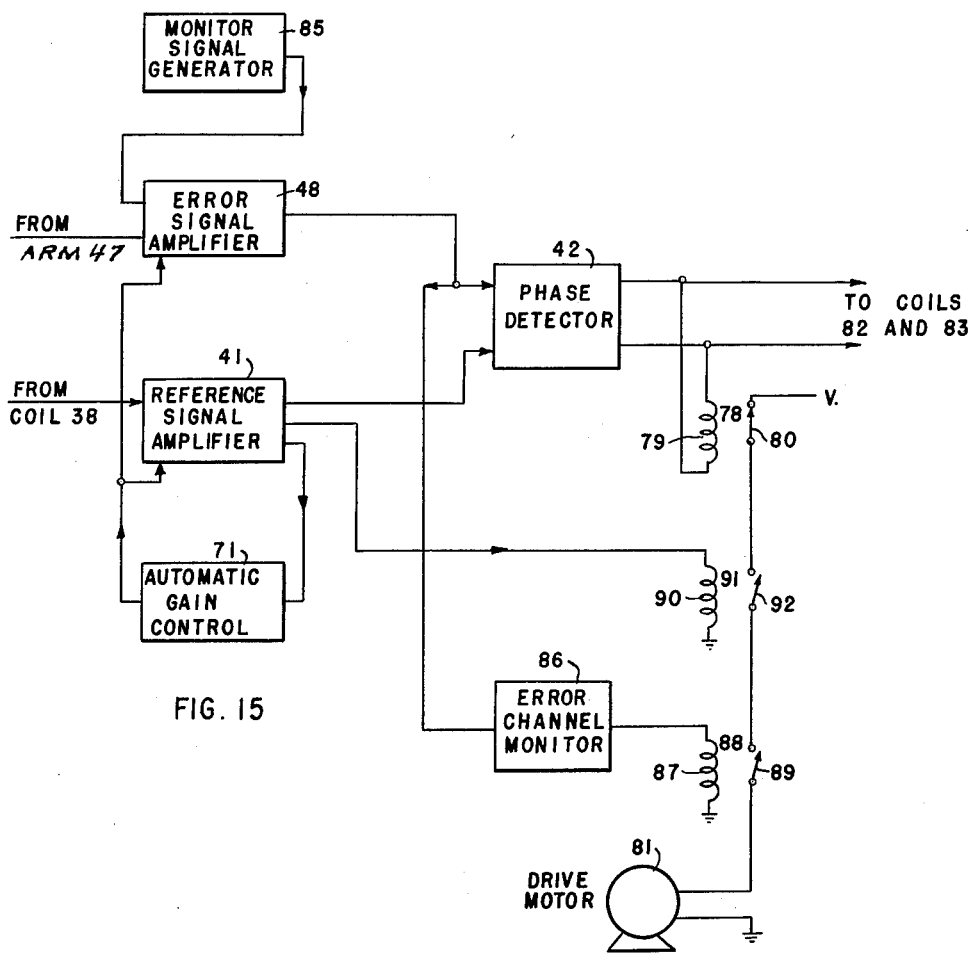

FIGURE 15 shows an alternative method for stopping the forward motion of truck 20 upon equipment failure or substantial deviation from the desired course. A monitor signal generator 85 has its output terminal coupled to an input terminal of error signal amplifier 48. The output of monitor signal generator 85 may be a frequency which is a multiple of the frequency of the signal coupled from conductor 29 to coils 38 and 66. Error signal amplifier 48 may be a wide band amplifier, suitable for amplifying both signals; therefore signals of both frequencies appear at the output terminal of error signal amplifier 48 and are coupled to the upper input terminal of phase detector 42. Phase detector 42 is constructed to pass only frequencies corresponding to error signals; therefore, the monitor signal is rejected by phase detector 42. Signals of both frequencies are coupled to the input terminal of error channel monitor 86, the output terminal of which is coupled through a coil 87 of a relay 88 to ground. Error channel monitor 86 is constructed to pass only signals of the monitor signal generator frequency. Therefore it is apparent that when error signal amplifier 48 is functioning properly, a signal from monitor signal generator 85 will be received and passed through error channel monitor 86, actuating relay 88; this actuation displaces relay arm 89 from the de-energized position shown in FIGURE 15 to the energized position. A portion of the output signal from reference coil 38, after passing through the reference amplifier 41, is coupled to coil 90 of relay 91; relay 91 is normally de-energized as illustrated in FIGURE 15. When a reference signal of sufficient amplitude is coupled from conductor 29 through coil 38 and reference signal amplifier 41 to coil 90 of relay 91, relay arm 92 is operated to the closed position. Relay 78 is shown in its de-energized position. Therefore, after relays 88 and 91 have been energized, a circuit is completed from a point of unidirectional operating potential through arm 80 of relay 78, through arm 92 of relay 91, through arm 89 of relay 88, and through drive motor 81 to a point of reference potential, such as ground.

The importance of the fail-safe circuitry of FIGURES 14 and 15 is obvious when it is noted that any substantial course deviation by a truck pulling, carrying, or lifting a heavy load might well injure life and/or property. It is therefore desirable that truck 20 be quickly halted if, for any reason, an appreciable course deviation occurs. This is accomplished by employing relay 78 which remains unenergized in the presence of normal error signals operating coils 82 and 83 of polarized relay P, but becomes energized in the presence of excessive error signals that are developed if truck 20 is slightly off normal course, opening contact 80 and halting truck 20. An additional safety circuit is provided by relay 76 in FIGURE 14 and relay 91 of FIGURE 15. In FIGURE 15, if truck 20 is even farther off course, a signal of reduced amplitude is coupled through coil 38 and reference signal amplifier 41 to coil 90 of relay 91, which has been adjusted so that arm 92 returns to the open position when this reduced signal appears at coil 90. Relay 91 of FIGURE 15 operates in a similar fashion to stop truck 20. In this manner the guidance system guards against damage to life and property which might otherwise be caused by substantial deviation of a guided object from the desired course.

Figure 16:
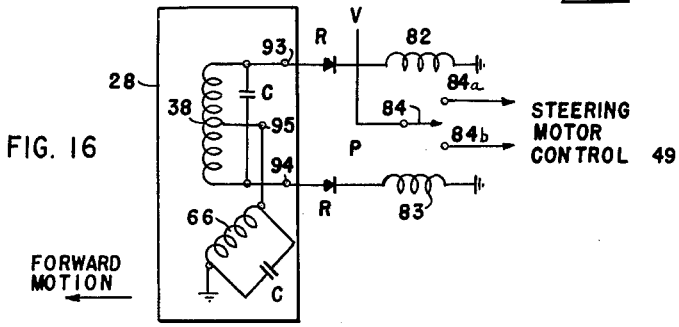
FIGURE 16 is a diagram of one arrangement of the antennae in one embodiment of the invention.

FIGURE 16 shows another control circuit for use with the invention, in which a two-coil embodiment is utilized. For maximum efficiency the coils are tuned to the frequency of the alternating current in electrical conductor 29 by means of capacitors C. The terminals of reference coil 38 are coupled to points 93 and 94, which in turn are connected through rectifiers R to coils 82 and 83, respectively, of the polarized relay. One terminal of combination coil 66 is connected to ground, and the other terminal is connected through point 95 to the center of reference coil 38. It is apparent that the voltage induced in coil 38 instantaneously exhibits opposite polarities at points 93 and 94. The error signal voltage coupled from combination coil 66 to point 94 reinforces the potential in one-half of coil 38, but opposes the potential appearing in the other half.

Let us assume that instantaneously truck 20 is following the on-course path, so that no error signal appears at point 95; also assume that a ten volt signal is induced in coil 38, it being understood the particular value is given only by way of example. This ten volt signal appears across coil 38, so that at point 93 a voltage of five volts with respect to ground, and of a given phase, appears, while at point 94 a voltage of five volts with respect to ground, and of opposite phase, appears. Because of the unilateral characteristic of rectifiers R these equal alternating voltages cause equal direct currents to flow in coils 82 and 83; relay arm 84 is not operated and truck 20 maintains its on-course path.

Assume now that truck 20 has been displaced to one side of the on-course path, and is aligned parallel to the on-course path. The voltage induced in reference coil 38 has been reduced, say to eight volts, so that at point 93 a positive four volts with respect to point 95, and of a given phase, is measured, and at point 94 a negative four volts with respect to point 95, and of opposite phase, is measured. A voltage proportional to the lateral displacement is induced in combination coil 66, and a portion of this voltage is coupled to common point 95; let us say that this voltage at point 95 is measured as a positive five volts with respect to ground, and of the same phase as that of the voltage appearing between points 93 and 95. This potential is added algebraically to the potential appearing between points 93 and 95. Thus the potential appearing at point 93 is reinforced to nine volts with respect to ground. Similarly the voltage appearing between point 95 and ground is subtracted from that appearing between points 94 and 95 so that the voltage appearing at point 94 is one volt with respect to ground. Therefore the current flow through coil 82 is approximately nine times that of the flow through coil 83, and relay arm 84 is operated to the upper position, resulting in corrective action being taken by truck 20. After this corrective action is taken an angle-measuring voltage, proportional to the rotation of steering column 22 with respect to the truck's longitudinal axis, is induced in combination coil 66; when this voltage is equal in magnitude to the lateral displacement voltage, no error signal appears at common point 95, and the rotation of steering column 22 terminates. This action has been explained in connection with the other control circuits of the invention. It is apparent that, if truck 20 is displaced to the opposite side, the lateral displacement voltage appearing at point 95 is of the opposite phase, and say again of five volts magnitude. This five volts coupled to point 95 results in one volt appearing at point 93, and nine volts with respect to ground appearing at point 94. Hence the curret flow in coil 83 is approximately nine times greater than that appearing in coil 82, and corrective action in the opposite direction is effected. The direct addition of the reference and error voltages as illustrated in FIGURE 16 results in economies by permitting the deletion of the reference and error signal amplifiers, and the phase detector.

Figure 17:
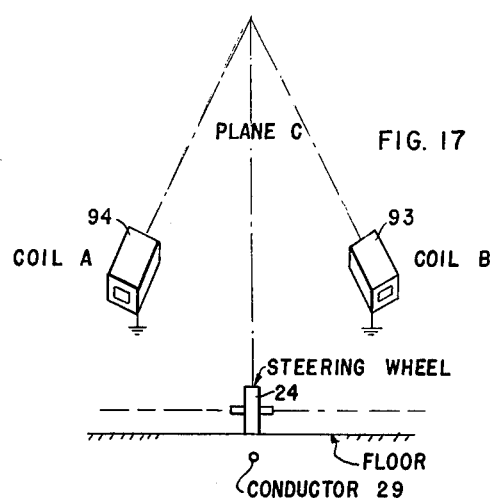
FIGURE 17 is a diagram of an arrangement of the antennae according to a further embodiment of the invention.

It will be apparent from the foregoing descriptions that coils may be arranged in various other combinations to provide electrical signal equivalents. One such embodiment is shown in FIGURE 17, wherein each coil of a pair is disposed so that a projection of its axis intercepts plane C of FIGURE 17 at an angle; plane C is normal to the transverse axis of the steering wheel 24, and plane C is common to both the vertical axis of steering wheel 24 and to conductor 29 (when steering wheel 24 is on course). Further the axis of each coil is tilted forward in the direction of travel as illustrated in FIGURE 17 (the direction of travel is assumed to be out of the drawing, in the direction of the reader).

It will be apparent from the foregoing explanation of the nature of the signals generated by the individual coil combinations shown in FIGURES 3 and 9a that the signal output of coil A (to the left of plane C in FIGURE 17) is equivalent to the signal output of error signal coil 66 and the lower half section of reference signal coil 38 as shown in FIGURE 16. Similarly, the signal output of coil B (to the right of plane C in FIGURE 17) is equivalent to the signal output of error signal coil 66 and the upper half section of reference signal coil 38 as shown in FIGURE 16. To supplant coils 38 and 66 of FIGURE 16, one terminal of each of coils A and B (FIGURE 17) may be connected to ground; the other terminal of coil A may be connected to point 94 and the remaining terminal of coil B may be connected to point 93 of FIGURE 16. The manner of control of the vehicle in accordance with the basic azimuth control concept of the invention will be apparent from the foregoing considerations of the manner of operation of the control circuit shown in FIGURE 16.

Other coil combinations which provide electrical signals equivalent to those taught in the several figures and embodiments of the application will be readily apparent to those skilled in the art and such combinations are considered to be within the scope and teaching of the invention.

The installation of an electronic guidance system, as disclosed and claimed in this application, affords substantial economies over any known mechanical guidance systems. It is both easy and economical to install an insulated conductor along the ceiling, on the wall, or to bury the conductor under the floor of a structure. The components of the control systems are few and simple, and power for the system can be derived from an electric storage battery. Because most industrial tractor trucks carry such batteries to power their drive motors, the provision of power is simple and economical. Maintenance costs are extremely low, for there are few operating parts; all of the parts are simple, and admit of easy repair and replacement. Because electromagnetic coupling between the guide conductor and the guided truck of the invention is employed, no mechanical coupling is required to drive the truck through a factory or other structure upon a predetermined course. The truck does not have to be hooked to a conveyor belt or attached to a moving chain to commence its locomotion; rather, a simple push of a button sends the truck surely and certainly upon the desired path. It is apparent that the cost, both of installation and subsequent maintenance, of an electronic guidance system is far below that of any comparable guidance system known to the prior art.

While a particular embodiment of the invention has been shown and described, it is apparent that modifications and alterations may be made, and it is intended in the appended claims to cover all such modifications and alterations as may fall within the true spirit and scope of the invention.

What is claimed is:

1. In a guidance system in which a mobile unit includes steering control means for guiding same along a course which is predetermined by signals representative of a given signal path: path-detection means mounted on said mobile unit comprising first sensing means for producing at least one reference signal from said path-representative signals, and second sensing means for simultaneously producing from said path-representative signals a composite error signal including a lateral displacement error signal which varies with each variation in the extent and direction of displacement of said mobile unit relative to said predetermined course and a heading error signal, said second sensing means comprising at least one sensing element mounted on said unit relative to said signal path to detect a signal of a first value from said path as the heading of said path-detection means coincides with the heading of said predetermined course, and to detect a signal from said path of a different predetermined value for each different angle of deviation of said path-detection means with respect to said predetermined course, the different value error signals for each different heading thereby continually denoting the heading of said path-detection means relative to said predetermined course; comparer means coupled to said first and second sensing means for comparing said composite error signal, including said heading error signal and said lateral displacement error signal, with said reference signal and developing a steering signal therefrom; and output means coupled to said comparer means for extending said steering signal to said steering control means for said mobile unit.

2. In a guidance system in which a mobile unit includes steering control means for guiding same along a course which is predetermined by signals representative of a given signal path: path-detection means disposed on said mobile unit comprising first electrically conductive coil means for producing a reference signal of given phase from said path-representative signals, and second electrically conductive coil means mounted with the plane thereof tilted at an acute angle relative to a horizontal reference plane for simultaneously producing from said path-representative signals a composite error signal of a phase related to the phase of the reference signal, which composite error signal has a value which varies with each variation in the heading of said path-detection means relative to said given signal path and the extent and direction of the displacement of said path-detection means relative to said given signal path; and output means coupled to said first and second coils for combining said reference signal and said composite error signal; and for extending the combined signal to said steering control means.

3. In a guidance system in which a mobile unit includes steering control means for guiding same along a course which is predetermined by signals representative of a given signal path: path-detection means disposed on said mobile unit comprising a first electrically conductive coil means for producing a first and a second reference signal from said path-representative signals, and a second electrically conductive coil means mounted with the plane thereof tilted at an acute angle relative to a horizontal reference plane for simultaneously producing from said path-representative signals a composite error signal of a value which varies with each variation in both the heading of said path-detection means relative to said given signal path and the extent and direction of displacement of said path-detection means from said given signal path; circuit means for combining said composite error signal with said first reference signal to provide a first steering signal and for combining said composite error signal with said second reference signal to provide a second steering signal; and output means coupled to said circuit means for extending said first and second steering signals to said steering control means.

4. In a guidance system in which a mobile unit includes steering control means for guiding same along a course which is predetermined by signals representative of a given signal path: path-detection means disposed on said mobile unit comprising a first electrically conductive coil member for producing a predetermined reference signal from said path-representative signals, and a second electrically conductive coil member mounted with the plane thereof tilted at an acute angle relative to a horizontal reference plane for simultaneously producing from said path-representative signals a composite error signal of a value which varies with each variation in both the heading of said path-detection means relative to said given signal path and the extent and direction of displacement of said path-detection means from said given signal path.

5. In a guidance system in which a mobile unit includes control means for guiding same along a course which is predetermined by means for providing a magnetic field defining a given signal path: path-detection means disposed on said mobile unit to provide steering signals to said control means comprising a first coil member, means for mounting said first coil member in a plane which is normal to a horizontal reference plane to intercept the lines of force of said field and produce a predetermined reference signal, a second coil member, and means for mounting said second coil member with the plane of said second coil tilted at an acute angle relative to the horizontal reference plane to intercept the lines of force of said field responsive to lateral displacement of said path-detection means from the predetermined course, and also to intercept lines of force of said field responsive to rotation of said path-detection means from its on-course heading for providing a composite error signal which as compared with said reference signal is characteristic of both the heading of said path-detection means relative to said given signal path and the degree and direction of displacement of said path-detection means from said given signal path.

6. In a guidance system in which a mobile unit includes control means for guiding same along a predetermined course which is displaced laterally from a given signal path defined by a conductor carrying current to establish a magnetic field and thus provide path-representative signals: path-detection means disposed on said mobile unit to provide steering signals to said control means comprising a first means for deriving from said path-representative signals a reference signal and a second means comprising a coil member for deriving from said path-representative signals a composite error signal which as compared to said reference signal indicates the angular displacement measured between the heading of said path-detection means and the heading of said predetermined course and indicates the degree and direction of lateral displacement of said path-detection means from said predetermined course, and means for mounting said coil member in a plane disposed at an acute angle with respect to a horizontal reference plane to thereby generate a zero signal whenever said path-detection means is on the predetermined course and the heading thereof corresponds to the heading of said predetermined course; and means for extending said reference and composite error signals to said control means to maintain said mobile unit on said predetermined course.

7. In an electronic guidance system in which a mobile vehicle includes a steering control unit for guiding same along a course predetermined by signals representative of a given signal path, means for formulating steering instructions for said steering control unit comprising a first sensitive means having a given axial alignment for producing a reference signal output; a second sensitive means having its axis aligned substantially perpendicular to the axis of said first sensitive means for producing a heading signal output which is indicative of the angle defined by the intersection of a vehicular axis and a reference axis; a third sensitive means having its axis aligned substantially perpendicular to the axes of both said first and second sensitive means for producing a displacement signal output which is indicative of the distance and direction between a vehicular point and a reference point; means for producing a combination signal by comparing said heading signal and said displacement signal; and means for extending said reference and combination signals to said steering control unit.

8. In an electronic guidance system in which a mobile vehicle is guided along a course predetermined by signals representative of a given signal path and the means for guiding said vehicle includes a steering control unit: path-detection means disposed on said vehicle for formulating steering instructions from said path-representative signals comprising a first sensing means for producing a reference signal output, and a second sensing means mounted with the plane thereof tilted at an acute angle relative to a horizontal reference plane for simultaneously producing from said path-representative signals a composite error signal of a value which varies with each variation in both the heading of said path-detection means relative to said given signal path and the extent and direction of displacement of said path-detection means from said given signal path; comparer means coupled to said first and second sensing means for comparing said error signal with said reference signal to derive a resultant signal embodying steering instructions for maintaining said vehicle on an approach path to which said given signal path is asymptotically related; and means coupled to said comparer means for extending said resultant signal to said steering control unit.

9. In an electronic guidance system in which a mobile vehicle includes a steering control unit for guiding same along a course predetermined by signal reprentative of a given signal path, guidance means including said steering control unit, means for formulating steering instructions comprising a first electrically conductive coil member having a given axial alignment for producing a reference signal output; a second electrically conductive coil member having its axis aligned substantially perpendicular to the axis of said first member for producing a heading signal output proportional to an angle defined by the intersection of a vehicular axis and a reference axis; a third electrically conductive coil member having its axis aligned substantially perpendicular to the axes of both said first and second members for producing a displacement signal output proportional to the distance and indicative of the direction between a vehicular point and a reference point; means for producing a combination signal by comparing said heading signal and said displacement signal; means for comparing said combination signal with said reference signal to derive a resultant signal embodying steering instructions; and means for extending said resultant signal to said steering control unit.

10. In an electronic guidance system in which a mobile vehicle includes means for formulating signals for steering said vehicle along a given course predetermined by signals representative of a given signal path comprising a steering control unit; a first electrically conductive coil member having a given axial alignment for producing a reference signal output of unvarying phase; a second electrically conductive coil member having its axis aligned substantially perpendicular to the axis of said first member for producing a heading signal output of a phase and amplitude which vary with the vehicle heading; a third electrically conductive coil member having its axis aligned substantially perpendicular to the axes of both said first and second members for producing a displacement signal output of phase and amplitude which vary with the displacement of the vehicle from the course and the side of the path to which the vehicle is displaced, the signal output being opposite in phase to that of said second coil member; means for producing a combination signal by combining algebraically the amplitudes and phases of said heading and said displacement signals; means for comparing the phases and amplitudes of said combination signal and said reference signal to derive a resultant signal for maintaining said vehicle on said course; and means for extending said resultant signal to said steering control unit.

11. In an electronic guidance system including a mobile vehicle and a steering control unit for said vehicle, means for formulating steering instructions for guiding said vehicle along a predetermined course defined by signals representative of a given signal path comprising: path-detection means including a first coil member for producing a reference signal output of unvarying phase from said path-representative signals, and a second coil member mounted with the plane thereof tilted at an acute angle relative to a horizontal reference plane for simultaneously producing from said path-representative signals a composite error signal of a phase and amplitude which vary both with the heading of said path-detection means relative to said predetermined course and with the direction and extent of displacement of said path-detection means relative to said predetermined course; comparer means coupled to said first and second coil members for comparing the phases of said error signal and said reference signal to derive a resultant signal for maintaining the vehicle on said course; and means coupled to said comparer means for extending said resultant signal to said steering control unit.

12. In an electronic guidance system in which a mobile unit is guided along a course predetermined by signals representative of a given signal path, means for formulating steering instructions for guiding said mobile unit comprising a first electrically conductive coil having a pair of output terminals and a center tap connected to produce a first and a second reference signal output of different phases; a second electrically conductive coil mounted with the plane thereof tilted at an acute angle relative to a horizontal reference plane for producing a composite error signal of varying phase proportional both to a vehicular heading and to a vehicular displacement, a pair of terminals for said second coil, one of said terminals being connected to a point of reference potential and the other terminal being connected to said center tap of said first coil, to thereby effect algebraic addition of said error signal with said reference signal in each portion of said first coil; and means including a polarized relay for utilizing said resultant signals to provide steering instructions for said mobile unit.

13. A guidance system for a mobile vehicle having steering control means for guiding same along a course predetermined by signals representative of a given signal path responsive to receipt of steering signals derived from said signal path, said vehicle having a longitudinal axis disposed parallel to the direction of vehicle travel and a transverse axis disposed both perpendicular to the direction of vehicle travel and lying in a plane parallel to the plane of said longitudinal axis, said system including means for sensing the heading and the lateral displacement of said vehicle relative to said predetermined course in providing said steering signals comprising: a first electrically conductive coil member having its axis disposed substantially parallel to said transverse axis; a second electrically conductive coil member having its axis disposed substantially parallel to said longitudinal axis; and a third electrically conductive coil member having its axis disposed substantially perpendicular to both said longitudinal and transverse axes, and means for coupling the signals detected by said coil members to said steering control means.

14. A guidance system for a mobile vehicle including steering control means for guiding same along a course predetermined by signals representative of a given signal path responsive to receipt of steering signals derived from said signal path, means for sensing the heading and lateral displacement of said vehicle relative to said predetermined course in providing said steering signals comprising: a first electrically conductive coil member having a particular axial alignment with respect to said vehicle; a second electrically conductive coil member having its axis aligned substantially perpendicular to the axis of said first coil; and a third electrically conductive coil member having its axis aligned substantially perpendicular to the axes of both said first and second coils, and means for coupling the signals detected by said coil members to said steering control means.

15. In a guidance system for a mobile vehicle including steering control means for guiding same along a course predetermined by signals representative of a given signal path responsive to receipt of steering signals derived from said signal path, said vehicle having a longitudinal axis disposed parallel to the direction of vehicle travel, a transverse axis disposed both perpendicular to said longitudinal axis and lying in a plane substantially parallel to the plane of said longitudinal axis, and a vertical axis disposed perpendicular to both said longitudinal and transverse axes, a sensing means mounted on said vehicle for sensing the heading and the lateral displacement of said vehicle relative to said predetermined course in providing said steering signals comprising a first electrically conductive coil member, the plane of said first coil member being substantially perpendicular to said transverse axis and substantially parallel to both said longitudinal and said vertical axes, and a second electrically conductive coil member, the plane of said second coil member being substantially parallel to said transverse axis and angularly disposed relative to said longitudinal and vertical axes, and means for coupling the signals detected by said coil members to said steering control means.

16. In a guidance system for a mobile vehicle adapted to be guided along a predetermined course which is established by a current-carrying conductor: sensing means for indicating the intantaneous heading and lateral displacement of said vehicle relative to said predetermined course comprising a first electrically conductive coil member mounted with its axis angularly disposed intermediate a horizontal and a vertical plane to provide a composite signal which as compared with a reference signal is indicative of the heading of said sensing means relative to said course and indicative of the degree and direction of lateral displacement of said sensing means relative to said course, and a second electrically conductive coil member mounted with its axis substantially transverse to the axis of said first coil member to provide a phase reference signal for comparison with said composite signal.

17. In an electronic guidance system for a mobile vehicle, means for formulating steering instructions for guiding said mobile vehicle along a course predetermined by signals representative of a given signal path, said vehicle having a vertical reference plane substantially parallel to the direction of vehicle travel and a horizontal reference plane substantially parallel to the direction of vehicle travel and substantially perpendicular to said vertical reference plane, said means comprising a first electrically conductive coil positioned on one side of said vertical reference plane having its axis disposed such that a projection of said axis forms an acute angle with said vertical reference plane and an acute angle with said horizontal reference plane, the forward portion of said first coil with respect to the direction of vehicle travel being inclined downwardly, and a second electrically conductive coil positioned on the other side of said vertical reference plane having its axis disposed such that a projection of said axis forms an acute angle with said vertical reference plane and an acute angle with said horizontal reference plane, the forward portion of said second coil with respect to the direction of vehicle travel being inclined downwardly, means for producing position signals embodying vehicle heading and lateral displacement information in said first and second coils, and means for combining said position signals to formulate said steering instructions.

18. A guidance system according to claim 1 and further comprising driving means for propelling said mobile unit, and fail-safe means for disabling said driving means and stopping said unit whenever said reference signal derived from said path-representative signals falls below a predetermined signal level.

19. A guidance system according to claim 1 and further comprising driving means for propelling said mobile unit, and fail-safe means for disabling said driving means and stopping said unit whenever said composite error signal exceeds a predetermined signal level.

20. A guidance system according to claim 1 and further comprising driving means for propelling said mobile unit, and fail-safe means for disabling said driving means and stopping said unit, including means operative to effect operation of said fail-safe means responsive to detection of malfunctioning of said path-detection and comparer means, and means operative to effect operation of said fail-safe means responsive to increase of said composite error signal above a predetermined signal level.

21. An electronic guidance system comprising means including an electrical conductor for establishing an electromagnetic field defining a predetermined course, a vehicle having propulsion means and steering means responsive to steering instructions, means on said vehicle for simultaneously formulating steering instructions dependent upon the extent and direction of lateral displacement and upon the heading of said vehicle with respect to said course including at least a first coil mounted with the plane thereof tilted at an angle acute relative to a horizontal reference plane to be sensitive to said field, and means for coupling said formulated steering instructions to said steering means.

22. An electronic guidance system comprising means including an electrical conductor for establishing an electromagnetic field defining a predetermined course, a vehicle having propulsion means and having steering control means responsive to steering instructions to guide said vehicle along said predetermined course, means for formulating said steering instructions including three electrically conductive coils mounted with their axes mutually perpendicular to each other to provide information signals which vary with both the displacement and the heading of said vehicle with respect to said predetermined course, and means for coupling the formulated steering instructionns to said steering control means.

23. In a guidance system for directing a mobile unit including steering control means along a path relative to a guide course predetermined by signals representative of a given signal path, a first means for providing a first composite signal, which signal includes a reference component and a component indicative of both lateral displacement and vehicle heading relative to said guide course, a second means for providing a second composite signal, which signal includes a reference component and a component indicative of both lateral displacement and vehicle heading of the unit relative to said guide course, at least one of said first and second means being mounted with the plane thereof tilted at an acute angle relative to a horizontal reference plane, said first and second composite signals being different in phase, and means for extending the outputs of said first and second means to said steering control means to effect guidance of the mobile unit relative to said path.

24. A guidance system including a mobile unit having steering control means for guiding same along a course predetermined by signals representative of a given path comprising: path-detection means disposed on said mobile unit for receiving the path-representative signals to provide control signals comprising pick-up means including at least a first pick-up member mounted to produce a first control signal and a second pick-up member mounted to produce a second control signal; comparer means coupled to said pick-up means including said first and second pick-up members to provide a steering signal by combining the output signals of said pick-up means including said first and second control signals which include reference information, heading information of a value which at any given position varies with each variation in the heading of said path detection means with respect to said predetermined course, and lateral displacement information of a value which varies with each variation in both the extent and direction of lateral displacement of said path detection means with respect to said predetermined course; and output means coupled to said comparer means for extending said steering signal to said steering control means in the guidance of said mobile unit along said course.

References Cited in the file of this patent

UNITED STATES PATENTS

| | | |
|---|---|---|
| 1,574,074 | Fessenden | Feb. 23, 1926 |
| 2,051,974 | Warner | Aug. 25, 1936 |
| 2,339,291 | Paulus et al. | Jan. 18, 1944 |
| 2,493,755 | Ferrill | Jan. 10, 1950 |
| 2,661,070 | Ferrill | Dec. 1, 1953 |
| 2,742,099 | Hagen | Apr. 17, 1956 |
| 2,750,583 | McCullough | June 12, 1956 |
| 2,766,426 | Wilhelm | Oct. 9, 1956 |
| 2,789,649 | Setzer | Apr. 23, 1957 |
| 2,835,858 | Moseley | May 20, 1958 |
| 2,847,080 | Zworykin et al. | Aug. 12, 1958 |

FOREIGN PATENTS

| | | |
|---|---|---|
| 166,578 | Great Britain | July 11, 1921 |

Disclaimer

3,009,525.—*Robert De Liban*, Glenview, Ill. GUIDANCE SYSTEMS. Patent dated Nov. 21, 1961. Disclaimer filed May 12, 1977, by the assignee, *Barrett Electronics Corporation*.

Hereby enters this disclaimer to claims 17 and 21 of said patent.

[*Official Gazette July 26, 1977.*]